United States Patent [19]

Millsap

[11] 3,898,580

[45] Aug. 5, 1975

[54] DUAL TIME CONSTANT PHASE LOCK OSCILLATOR

[75] Inventor: Larry R. Millsap, Orange, Calif.

[73] Assignee: Xerox Corporation, Stamford, Conn.

[22] Filed: Dec. 17, 1973

[21] Appl. No.: 425,351

[52] U.S. Cl. .................... 331/15; 330/29; 330/144; 331/17; 331/25; 340/174.1 A

[51] Int. Cl. .................... H03b 3/04

[58] Field of Search .................... 331/15, 17, 18, 25; 340/174.1 A; 330/29, 144, 145

[56] References Cited

UNITED STATES PATENTS

| | | | |
|---|---|---|---|
| 3,321,712 | 5/1967 | Frisch et al. | 331/17 X |
| 3,392,370 | 7/1968 | Neitzel | 330/144 X |
| 3,395,361 | 7/1968 | Brauer | 331/17 X |
| 3,510,779 | 5/1970 | Klapper | 331/17 X |
| 3,593,167 | 7/1971 | Koulopoulos | 331/17 X |
| 3,629,720 | 12/1971 | Sedra et al. | 330/145 X |

*Primary Examiner*—Siegfried H. Grimm
*Attorney, Agent, or Firm*—James J. Ralabate; Franklyn C. Weiss; Anthony J. Sarli, Jr.

[57] ABSTRACT

A dual time constant phase lock oscillator for use in digital circuits or similar applications where requirements vary between a relatively stable frequency and a need for rapid frequency capture. The gain of an operational amplifier is varied by producing step changes in the input impedance by means of a field effect transistor switch. This changes the loop-gain of the phase lock oscillator, thereby changing its characteristics.

12 Claims, 3 Drawing Figures

DUAL TIME CONSTANT PHASE LOCK OSCILLATOR

BACKGROUND OF THE INVENTION

1. Field of the Invention

The instant invention relates to digital disk storage devices and more particularly to a phase lock oscillator means therein for read-clock generation.

2. Description of the Prior Art

In digital disk storage systems, data is written on or read from a magnetic surface which is rotating at high speed. While the speed of the magnetic disk is held relatively constant, variations of plus or minus 2 percent in rotational speed are not unusual. To partially compensate for speed variations, a clock signal is customarily derived from the rotating spindle such that when data is written on the disk, that data is precisely clocked as a function of the rotational speed of the medium.

When data is read from the disk, however, a clock must be generated to coincide with the data intervals as produced by the disk. This clocking function may be performed by a phase lock oscillator referenced to the data signals as they are sensed by the read heads and amplified by the read amplifiers. The clock signal and the data signals from the read amplifiers are fed to a decoder where the data waveform is decoded for transmission to the device controller and ultimately to the system central processor.

During a read cycle, a steady frequency is required from the phase lock oscillator which would synchronize with the data as it is written on the disk. Therefore, any bit-to-bit variations in data transitions (jitter) must be disregarded. It is useful in such instances to provide a relatively slow response of the phase lock oscillator such that minor bit-to-bit phase variations may be disregarded.

During a transition from a write cycle to a read cycle (and vice versa), or from an idle mode to either read or write, it is necessary for the phase lock oscillator to rapidly settle from a large step change in phase.

It is an object of the invention, therefore, to provide a phase lock oscillator with a variable gain such that a fast or slow response may be selected according to the most desirable operation characteristics of the system.

SUMMARY OF THE INVENTION

The purpose of the invention is to provide a phase lock oscillator with a variable time constant. A means is provided for varying the loop-gain of the phase lock oscillator by varying the gain of an error amplifier which forms a part of the phase lock oscillator. In a preferred embodiment, the gain of the amplifier is changed by modifying the input impedance of the amplifier through the use of a field-effect transistor switch.

DESCRIPTION OF THE PREFERRED EMBODIMENT

Figure 1:
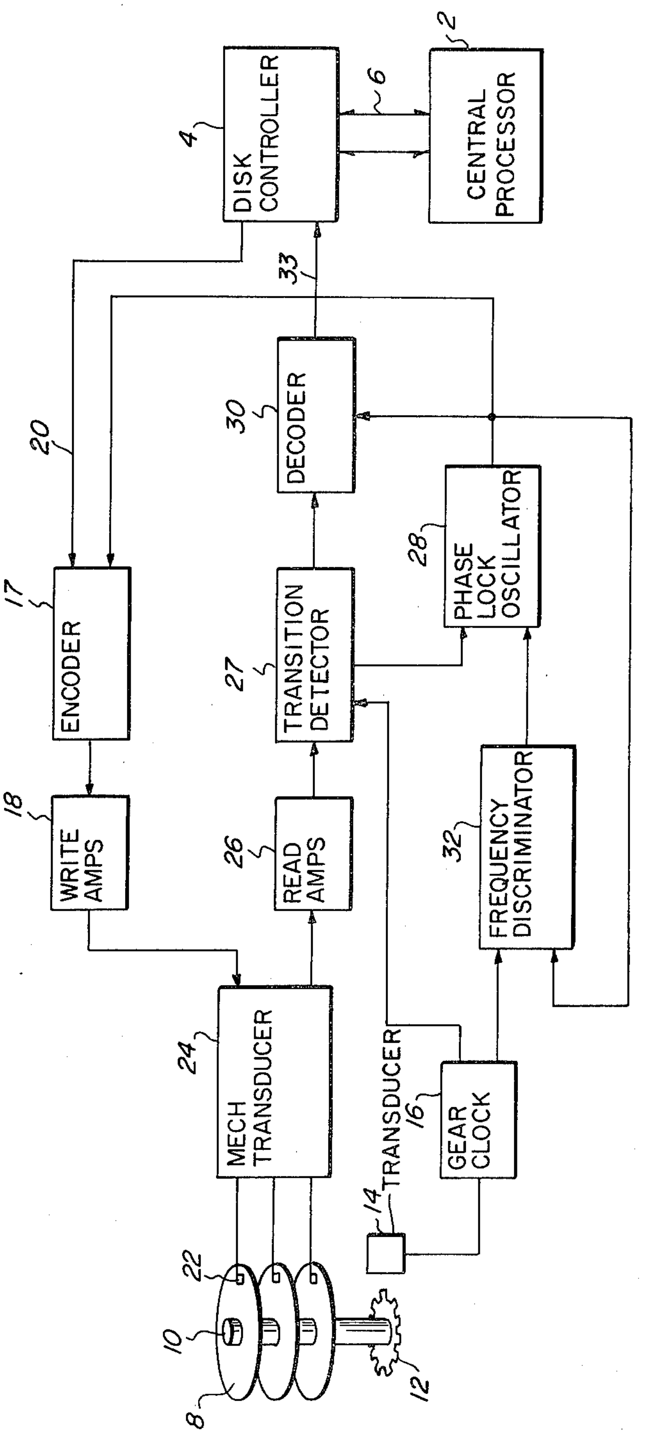
FIG. 1 is a block diagram of a digital disk storage system.

FIG. 1 is a block diagram of a digital disk storage system incorporating a phase lock oscillator according to the invention. A central processor is shown at 2 which is connected to a disk device controller 4 by means of a connecting cable 6. The central processing unit transmits to and receives from the controller data and control information for the purpose of writing the data on a disk surface shown generally at 8. The disk unit of FIG. 1 is shown as having a spindle 10 to which are attached a plurality of the magnetic recording surfaces 8. Attached to the spindle 10 is a gear 12 having a number of teeth thereon. The gear may be made of a ferrous material such that as the spindle and the gear attached thereto rotate, a transducer 14 will generate a pulse waveform with a frequency directly related to the rotational speed of the magnetic recording surfaces 8. The signals generated by the transducer 14 are applied to a gear clock generating circuit 16 for shaping.

The output of the gear clock 16 is applied to a frequency discriminator 32 and to a transition detector 27, the purpose of both of which is to ultimately produce a clocking signal for use in clocking data by a write encoder 17 and a data decoder 30.

In a write mode the gear clock signal is applied to transition detector 27 from which is derived a signal applied as a reference input to a phase lock oscillator 28. The output of the phase lock oscillator 28 is, in turn, applied to the write encoder 17. The clocking signal is used by the write encoder 17 to clock data received from the controller 4 over line 20 to write amplifiers 18 and ultimately to a magnetic transducer 22 to produce magnetically encoded spots on the disk surface 8. A plurality of such transducers are provided and may be mechanically attached to a mechanical transducer 24 to select one of a plurality of concentric tracks on the surface of the disk. Line 20 from the controller 4 may also carry information to properly position the heads 22 over the appropriate track and to select the appropriate one of the plurality of magnetic transducers 22 to write on a selected disk surface.

When data is to be read from the disk, the data is sensed by a magnetic transducer 22 which is positioned by a mechanical transducer 24 above the appropriate track to be read. As data is read from the disk surface a waveform is generated by the magnetic impulses recorded on the disk. These are amplified by the read amplifiers and applied to transition detector 27 and a signal derived therefrom is applied as an input to the phase lock oscillator 28. The phase lock oscillator 28 oscillates at a frequency such that a subharmonic thereof is equal to the frequency of the data being read. There are, however, variations which can occur due to variations in the speed of rotation of the disk. The phase lock oscillator 28 adjusts its frequency to the frequency of the data and the resultant oscillator output frequency is applied to a decoder 30. The data from the read amplifier 26 (through transition detector 27) is also applied to the decoder 30 and the data is decoded to a form usable by the controller 4 and the central processing unit 2. The data is passed to the controller over line 33.

At the time the transition to a read or write cycle is initiated, the phase lock oscillator may be running at a frequency and phase slightly different than the frequency and phase of the data due, as previously noted, to speed variations of the magnetic medium. Accordingly, the phase lock oscillator must rapidly settle from a large step change in phase to produce the precise read or write signal frequency and phase necessary for decoding the data. It is desirable to accomplish the phase change within the time required to read or write the "header" information to or from the disk. Header information usually preceeds any segment of data when recorded on or read from a disk. The header read or write time may be on the order of, for example, 30 microseconds or more.

In read mode, once the step change in phase has been accomplished by the phase lock oscillator 28 it is desirable that a stable frequency be generated and bit-to-bit variations in data transitions (jitter) be disregarded.

All phase lock oscillators have associated with them a natural frequency Wn and a damping factor D. In order to provide the steady frequency necessary for reading of data from the disk, reducing the natural frequency *Wn* and damping factor *D* slows the response to bit-to-bit phase variations. The large step change in phase which occurs during a transition to a read or write cycle, however, can be accomplished by increasing the natural frequency *Wn* and increasing the damping factor *D* to speed the response to the step-change.

Relationships exist between phase-lock oscillator loop-gain (*K*), natural frequency (*Wn*), and damping factor (*D*) as follows:

$$Wn = \sqrt{\frac{K}{t_1}} \qquad D = \frac{1 + Kt_2}{2Wnt_1}$$

Values can be selected such that: (1) increasing *K* increases *Wn* and increases D, (2) decreasing *K* decreases *Wn* and decreases *D*. *K* is directly a function of the gain of an operational amplifier which is also a portion of the mechanism of the filter within the phase lock oscillator. By changing the input resistor of the operational amplifier, *K* can be changed without affecting any other parameters that determine the response of the phase lock oscillator. In a preferred embodiment this may be made by turning a field effect transistor on and off. The purpose of the phase lock oscillator 28 is to generate a high frequency signal (8 MHz, for example) that is in phase with a lower frequency subharmonic reference signal (between 2 and 4 MHz).

Figure 2:
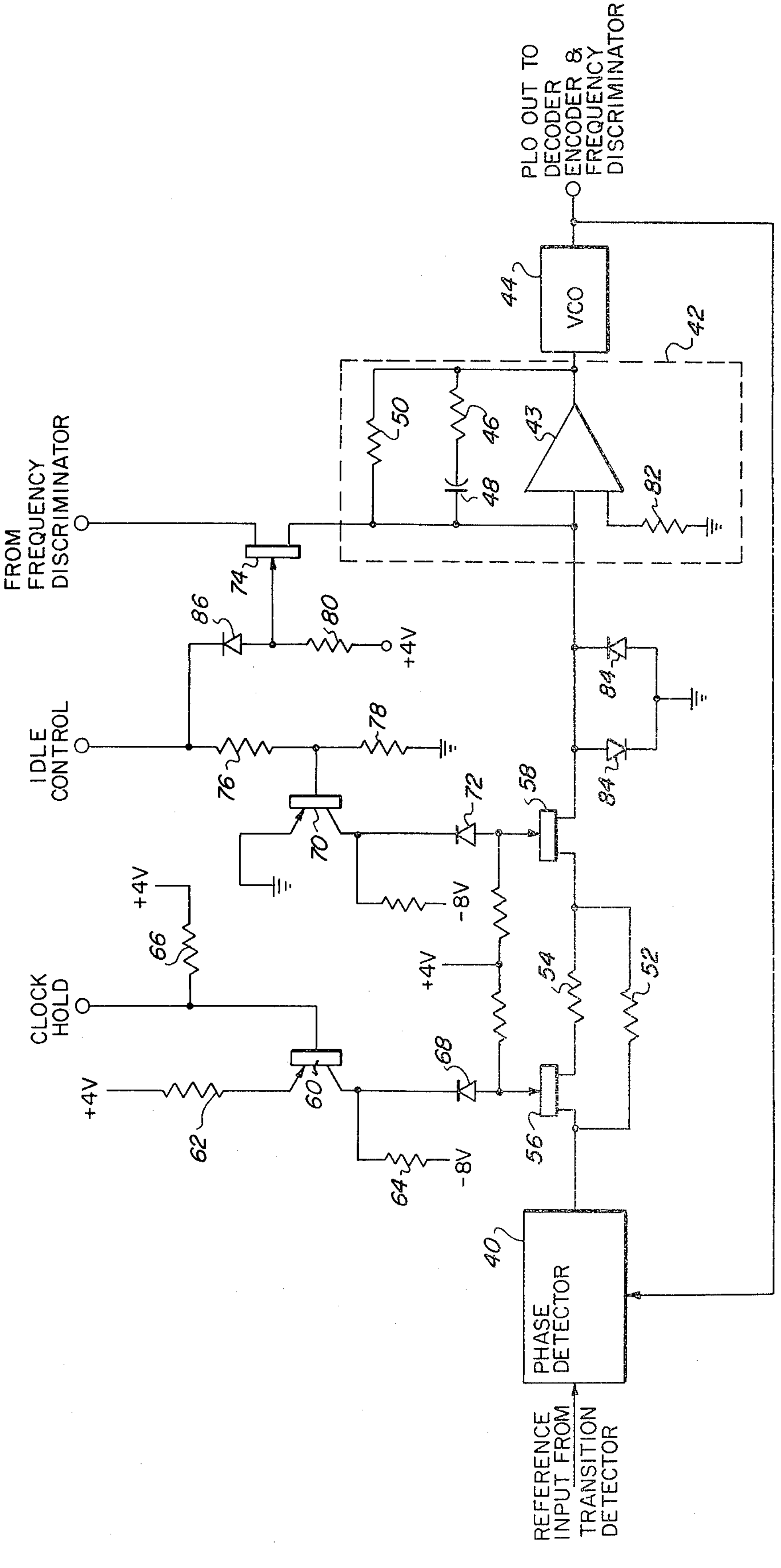
FIG. 2 is a partial schematic diagram of a phase lock oscillator according to the instant invention.

The phase lock oscillator, shown in more detail in FIG. 2, comprises primarily phase detector 40, an error amplifier and filter 42 with an operational amplifier 43, and a voltage controlled oscillator (VCO) 44.

The phase detector may be of the sample and-hold type having an amplifier with a gain of 1. The high frequency output of the VCO is sampled during the time that a current pulse is present at the reference input. The reference input in this case is derived from the data transitions as amplified by the read amplifiers and detected by the transition detector 27 shown in FIG. 1. The output of the phase detector 40 is fed to one input of an error amplifier and filter 42. The input circuitry shown in schematic form will be described below. The output of the error amplifier is applied to the voltage controlled oscillator 44, the output of which is fed back as the second input to the phase detector 40.

Figure 3:
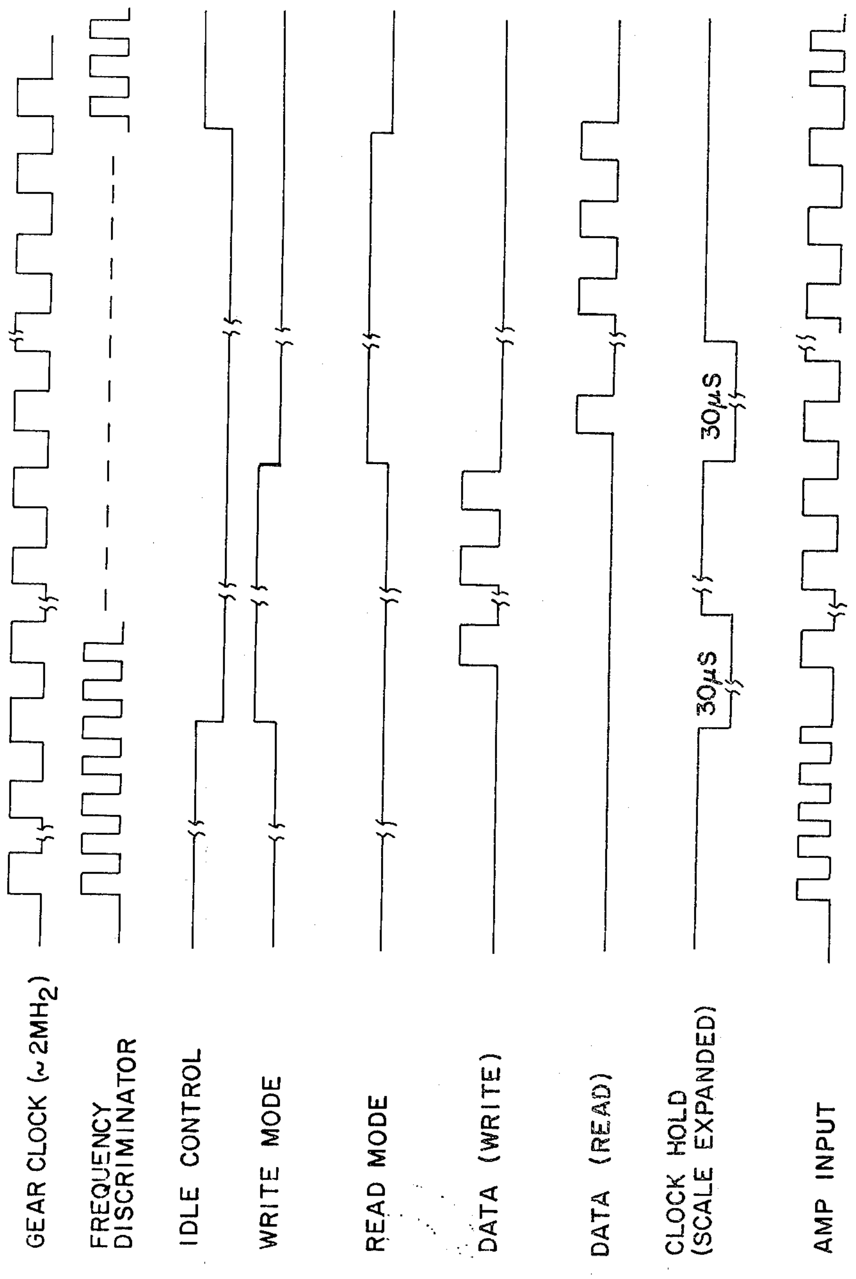
FIG. 3 is a waveform diagram showing the waveforms of critical signals as developed for and by the device of the invention.

A better understanding of the operation of the device of FIG. 2 may be had by referring to FIG. 3 in conjunction therewith for a description of the critical waveform patterns at selected points in the circuit.

The error amplifier 42 is mechanized as an operational amplifier with feedback elements 46, 48 and 50, and with input elements 52, 54, 56 and 58.

Upon receipt of a read or write command from the disk controller, the transition detector 27 is actuated to provide a signal as shown in FIG. 3 as the reference input to the phase detector 40 of FIG. 2. Upon receipt of any read or write command, a signal "Clock Hold" goes low thus turning on transistor 60. Resistors 62, 64 and 66 are merely biasing and reference level generating resistors. When transistor 60 is turned on, field effect transistor 56 is also turned on through diode 68. Field effect transistor 58 is normally on so the effective input impedance to the error amplifier 42 is the resistance 54 in parallel with resistance 52. This establishes the gain of the amplifier 42 at a high level for fast settling, wide band operation of the phase lock oscillator.

The signal Clock Hold is a timed pulse with a duration of, for example, 30 microseconds. This allows the phase lock oscillator to adapt to the step change in phase during approximately the period of time required to read the header information from the disk data track. After Clock Hold times out, transistor 60 turns off turning off transistor 56. With transistor 56 turned off, the effective input impedance to the error amplifier 42 is resistor 52. Resistor 52 may have a value in the range of four times as high as resistor 54. Thus, the gain of the amplifier 42 is substantially decreased and the phase lock oscillator accordingly becomes less sensitive to noise and jitter resulting from bit-to-bit change variations in the read data.

When a "read" or "write" command is received from the disk controller, a signal proportional to the frequency of the gear clock is supplied to the frequency discriminator and its output is applied to a terminal as indicated in FIG. 2. The frequency discriminator acts as a phase detector except that it also supplies error information for large frequency differences. Further, the signal Idle Control goes high and stays high for the duration of the idle mode. When Idle Control goes high, transistor 70 is turned off thus turning off field effect transistor 58 through diode 72. At the same time, field effect transistor 74 is turned on by means of diode 76 and resistor 80. Since FET 58 is now off and FET 74 is on, the signal derived from the gear clock (by means of the frequency discriminator) is applied as the input to the error amplifier 42. Again, resistors 76, 78 and 80 are merely biasing resistors. Resistor 82 is a reference-level-establishing bias resistor for the operational amplifier. The diodes 84 comprise merely a limiting circuit on the input of the operational amplifier 42.

The output of the phase lock oscillator is fed back as a feed back signal to frequency discriminator 32.

The purpose for connecting the gear-clock-derived signal to the phase lock oscillator during idle modes is to prevent the phase lock oscillator from drifting too far from nominal frequency for easy signal capture upon receipt of a read or write command.

The circuit of FIG. 2, then, provides a phase lock oscillator system which has a fast response for large step changes in phase which occur when the mode of operation is changed and a slow response to bit-to-bit jitter for read operations.

While the phase lock oscillator has been described in an embodiment with a digital disk storage system, it should be understood that the phase lock oscillator itself may have application apart from such a system, anytime that variable operating characteristics as provided herein are desired. It will be understood by those skilled in the art that various changes may be made and equivalents may be substituted for elements thereof without departing from the true spirit and scope of the invention.

What is claimed is:

1. In a digital disc storage system, means for generating a clock signal proportional to the frequency of data read from a disc, said means for generating a clock signal comprising:

a. a phase lock loop having a phase lock oscillator therein,
b. said phase lock loop including an amplifying means, for amplifying an input signal to said phase lock oscillator said input signal being derived from data read from said disk,
c. means for generating a control signal in response to a read command, and
d. means responsive to said control signal for varying the gain of said amplifying means.

2. A device as set forth in claim 1 wherein said means for varying the gain of said amplifying means is a switch for selecting one of a plurality of input impedance.

3. A device as set forth in claim 2 wherein said switch is at least one transistor.

4. A device as set forth in claim 3 in which said transistor is a field effect transistor.

5. A device as set forth in claim 1 further comprising:

a. means for generating a second clock signal proportional to the speed of rotation of said disc, and
b. means for selectively applying said second clock signal to said amplifying means,
c. whereby the output of the phase lock loop is held to a frequency nominally proportional to the frequency of data to be written on or read from said disc.

6. A device as set forth in claim 5 in which said second clock signal is applied during periods when data is neither being written on or read from said disc.

7. In a digital disc storage system, means for generating a read clock signal proportional to the frequency of data read from a disc, said means for generating said read clock signal comprising:

a. a phase lock loop having a phase lock oscillator therein,
b. said phase lock loop including an amplifying means for amplifying an input signal to said phase lock oscillator, said input signal being derived from data read from said disc,
c. means for generating a read/write signal, and
d. means responsive to said read/write signal for varying the gain of said amplifying means.

8. A system as set forth in claim 7 wherein said means for varying the gain of said amplifying means is a switch for selecting one of a plurality of input impedances to said means for amplifying.

9. A system as set forth in claim 8 wherein said switch is controlled by said read/write signal to apply a first input impedance for a predetermined period of time after which a second input impedance is applied to said means for amplifying.

10. A system as set forth in claim 7 further comprising means for generating a second clock signal at a frequency at which data is to be written on said disc, said means including said phase lock oscillator.

11. A system as set forth in claim 7 further comprising:

a. means for generating a third clock signal proportional to the speed of rotation of said disc, and
b. means for applying said third clock signal to said phase lock oscillator during periods when data is neither being written on nor read from said disc,
c. whereby the output of the phase lock loop is held to a frequency nominally proportional to the frequency of data to be written on or read from said disc.

12. A system as set forth in claim 10 further comprising:

a. means for generating a third clock signal proportional to the speed of rotation of said disc, and
b. means for applying said third clock signal to said phase lock oscillator during periods when data is neither being written on nor read from said disc,
c. whereby the output of the phase lock loop is held to a frequency nominally proportional to the frequency of data to be written on or read from said disc.

* * * * *